(12) United States Patent
Lai et al.

(10) Patent No.: US 10,786,082 B1
(45) Date of Patent: Sep. 29, 2020

(54) ROTATIONAL ADJUSTER OF ARMREST

(71) Applicants: Yu-Shan Lai, Taibao (TW); Yen-Chi Lai, Chiayi (TW)

(72) Inventors: Yu-Shan Lai, Taibao (TW); Yen-Chi Lai, Chiayi (TW)

( * ) Notice: Subject to any disclaimer, the term of this patent is extended or adjusted under 35 U.S.C. 154(b) by 0 days.

(21) Appl. No.: 16/386,487

(22) Filed: Apr. 17, 2019

(51) Int. Cl.
*A47C 1/03* (2006.01)
*A47C 7/54* (2006.01)
*B60N 2/75* (2018.01)

(52) U.S. Cl.
CPC .......... *A47C 1/0308* (2018.08); *A47C 1/0307* (2018.08); *A47C 7/541* (2018.08); *A47C 1/03* (2013.01); *B60N 2/763* (2018.02); *B60N 2/767* (2018.02); *B60N 2/773* (2018.02); *B60N 2/777* (2018.02)

(58) Field of Classification Search
CPC ....... A47C 1/03; A47C 1/0307; A47C 1/0308; A47C 7/541; B60N 2/763; B60N 2/767; B60N 2/773; B60N 2/777
USPC ........................................ 297/411.35–411.39
See application file for complete search history.

(56) References Cited

U.S. PATENT DOCUMENTS

| | | | | |
|---|---|---|---|---|
| 5,884,976 A * | 3/1999 | Breen | ...................... | A47C 1/03 297/411.35 |
| 6,074,012 A * | 6/2000 | Wu | .......................... | A47C 1/03 297/411.26 |
| 6,076,891 A * | 6/2000 | Bernhardt | ................ | A47C 1/03 297/411.31 |
| 6,948,775 B2 * | 9/2005 | Tsai | ......................... | A47C 1/03 297/411.2 |
| 7,159,947 B1 * | 1/2007 | Lee | ........................... | A47C 1/03 297/411.35 |
| 7,828,389 B2 * | 11/2010 | Oda | ......................... | A47C 1/03 297/411.35 |
| 7,837,269 B2 * | 11/2010 | Bock | ........................ | A47C 1/03 297/411.35 |
| 8,944,511 B2 * | 2/2015 | Wang | ....................... | A47C 1/03 297/411.23 |
| 9,044,098 B2 * | 6/2015 | Bauer | ...................... | A47C 7/54 |
| 9,320,360 B2 * | 4/2016 | Bauer | ...................... | A47C 1/03 |
| 9,603,456 B2 * | 3/2017 | Lai | ............................ | A47C 7/54 |
| 10,143,310 B1 * | 12/2018 | Wang | .................... | A47C 7/541 |
| 10,219,629 B2 * | 3/2019 | Serena | ..................... | A47C 1/03 |
| 10,537,175 B2 * | 1/2020 | Chen | ....................... | A47C 1/03 |

(Continued)

*Primary Examiner* — Syed A Islam
(74) *Attorney, Agent, or Firm* — Alan D. Kamrath; Mayer & Williams PC

(57) ABSTRACT

A rotation adjuster of an armrest is connected on a bottom of a supporting extension, a rotatable fixer connected on a holding tray, and a U-shaped plate having a circular groove, a slidable seat, a support post, two slidable engagement structures, and multiple arcuate notches. The holding tray includes a body and multiple spaced recesses. The rotatable fixer includes multiple columns, a circular protrusion, multiple receiving orifices configured to accommodate multiple springs, multiple balls and the multiple pushing elements respectively, and a connection orifice. The U-shaped plate includes the circular groove, a first rib, a threaded orifice, and two locking pegs. The slidable seat includes a U-shaped frame, a covering sheet, a first slot, and two second slots. Each slidable engagement structure includes multiple arcuate notches and a flexible projection received in a trench. A screw is inserted through the connection orifice of the rotatable fixer.

4 Claims, 7 Drawing Sheets

(56) References Cited

U.S. PATENT DOCUMENTS

| | | | |
|---|---|---|---|
| 10,537,176 B2* | 1/2020 | Bock | A47C 7/54 |
| 2002/0070598 A1* | 6/2002 | Perl | A47C 1/03 |
| | | | 297/411.35 |
| 2003/0030317 A1* | 2/2003 | Chen | A47C 1/03 |
| | | | 297/411.35 |
| 2008/0191104 A1* | 8/2008 | Wang | A47C 1/03 |
| | | | 248/118 |
| 2014/0145490 A1* | 5/2014 | Chen | A47C 1/03 |
| | | | 297/411.37 |
| 2017/0071345 A1* | 3/2017 | Tsai | A47C 1/03 |

* cited by examiner

ROTATIONAL ADJUSTER OF ARMREST

BACKGROUND OF THE INVENTION

Field of the Invention

The present invention relates to a rotation adjuster of an armrest which contains a holding tray connected on a bottom of a supporting extension, a rotatable fixer connected on a bottom of the holding tray, and a U-shaped plate having a circular groove which is rotatably connected with the rotatable fixer, a slidable seat engaged with an end of the U-shaped plate, and a support post connected with a bottom of the slidable seat, such that the supporting extension is rotated and moved forward, backward, leftward, and rightward relative to the support post.

Description of the Prior Art

A conventional armrest structure is arranged on a chair so as to support user's arms according to using ergonomics and requirements.

However, only a height of a supporting extension of the armrest is adjustable or the supporting extension is rotated to a specific angle, hence the user cannot move and rotate the supporting extension freely so as to support the user's arms stably. In other words, the height of the supporting extension of the armrest is adjustable, but the supporting extension cannot be rotated randomly based on the using requirements.

In addition, a width between two supporting extensions on two sides of the chair and a position of the two supporting extensions cannot be adjusted, thus lacking ergonomics.

The present invention has arisen to mitigate and/or obviate the afore-described disadvantages.

SUMMARY OF THE INVENTION

The primary objective of the present invention is to provide a rotation adjuster of an armrest which contains a supporting extension is adjustably moved forward and backward relative to a rotatable fixer via a holding tray, and the rotatable fixer is rotated 360 degrees relative to a circular groove of a U-shaped plate, hence an end of the U-shaped plate is engaged with a slidable seat so as to adjust the supporting extension leftward and rightward, and after a bottom of the slidable seat is connected with a support post, the supporting extension is rotated and moved forward, backward, leftward, and rightward relative to the support post.

Thereby, after fixing the rotation adjuster on two sides of a chair seat, the supporting extension is adjustable based on using requirements so as to support a user's two arms and to obtain using ergonomics.

To obtain above-mentioned objectives, a rotation adjuster of an armrest provided by the present invention contains: a supporting extension, a holding tray connected on a bottom of the supporting extension, a rotatable fixer connected on a bottom of the holding tray, and a U-shaped plate having a circular groove which is rotatably connected with the rotatable fixer, a slidable seat engaged with an end of the U-shaped plate, a support post connected with a bottom of the slidable seat, and two slidable engagement structures respectively defined between the holding tray and the rotatable fixer and between the U-shaped plate and the slidable seat.

The rotatable fixer includes multiple pushing elements fixed thereon, and multiple arcuate notches surround around an inner rim of the circular groove.

BRIEF DESCRIPTION OF THE DRAWINGS

FIG. 2-1 is an amplified perspective view of a back surface of FIG. 2.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
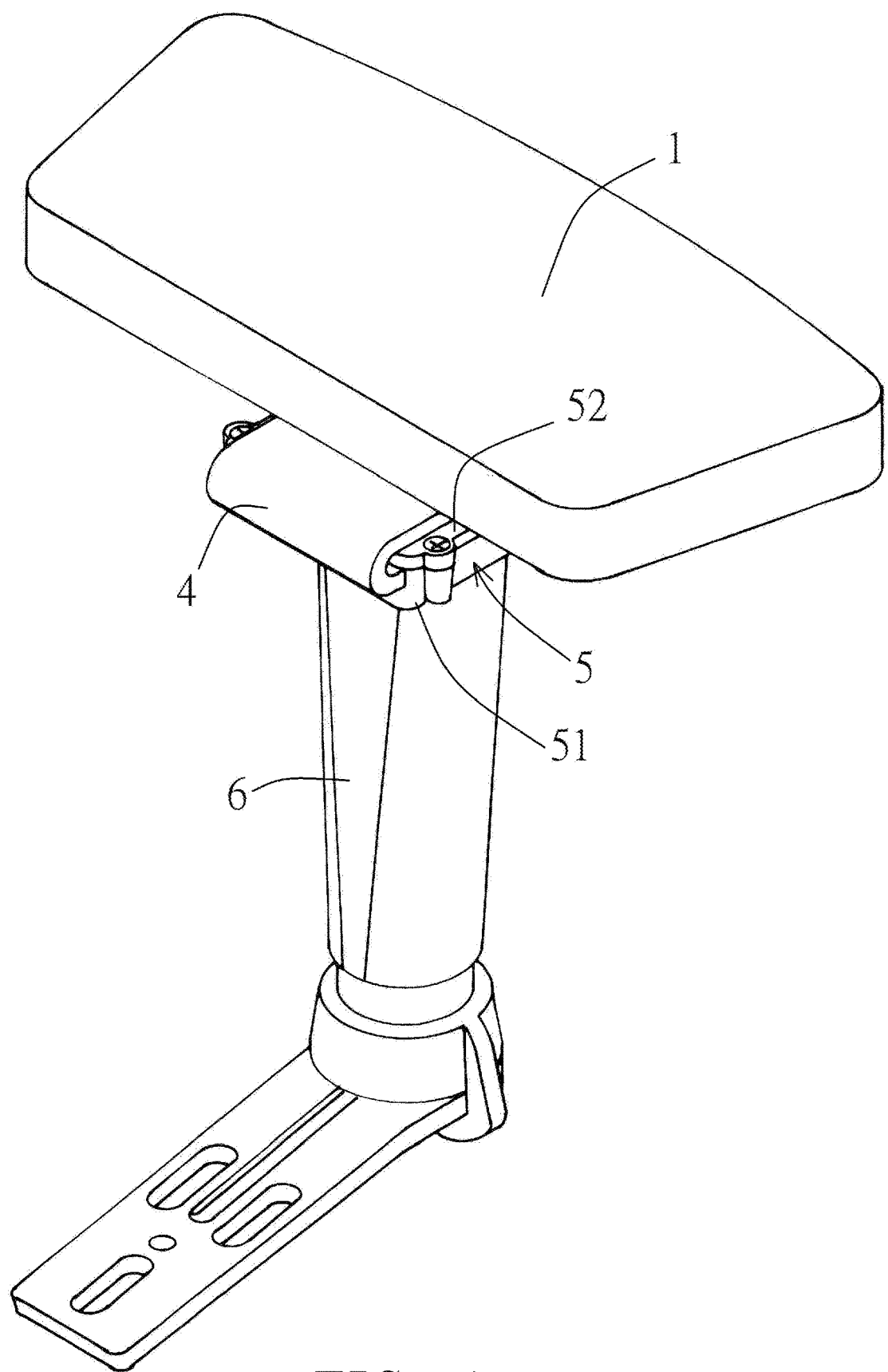
FIG. 1 is a perspective view showing the assembly of a rotation adjuster of an armrest according to a preferred embodiment of the present invention.
Figure 2:
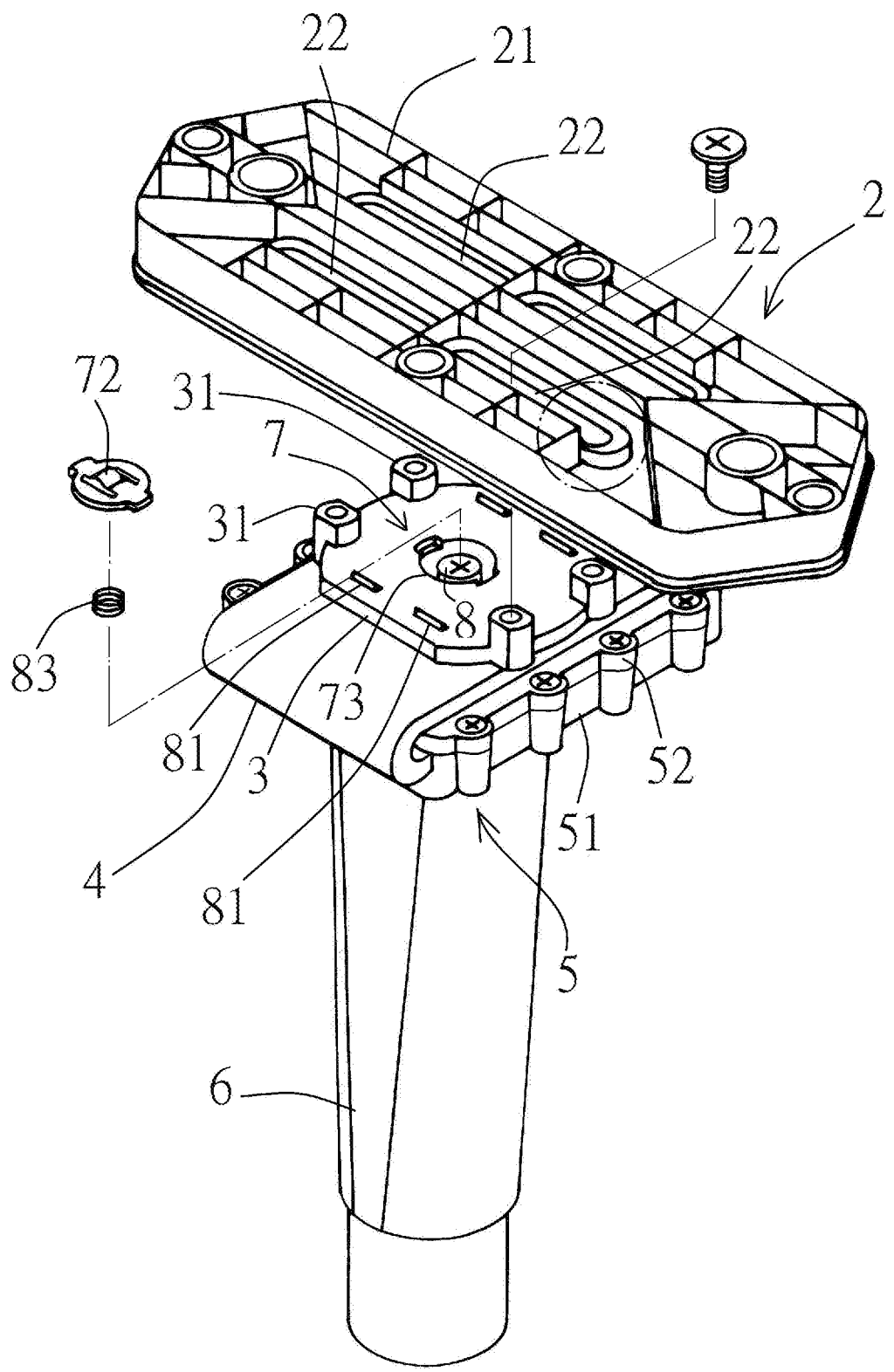
FIG. 2 is a perspective view showing the exploded components of the rotation adjuster of the armrest according to the preferred embodiment of the present invention.
Figures 1, 2:
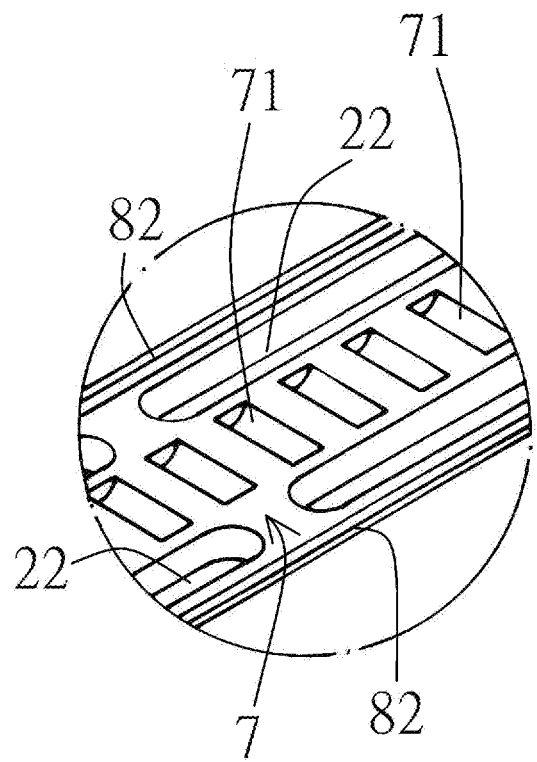
Figure 3:
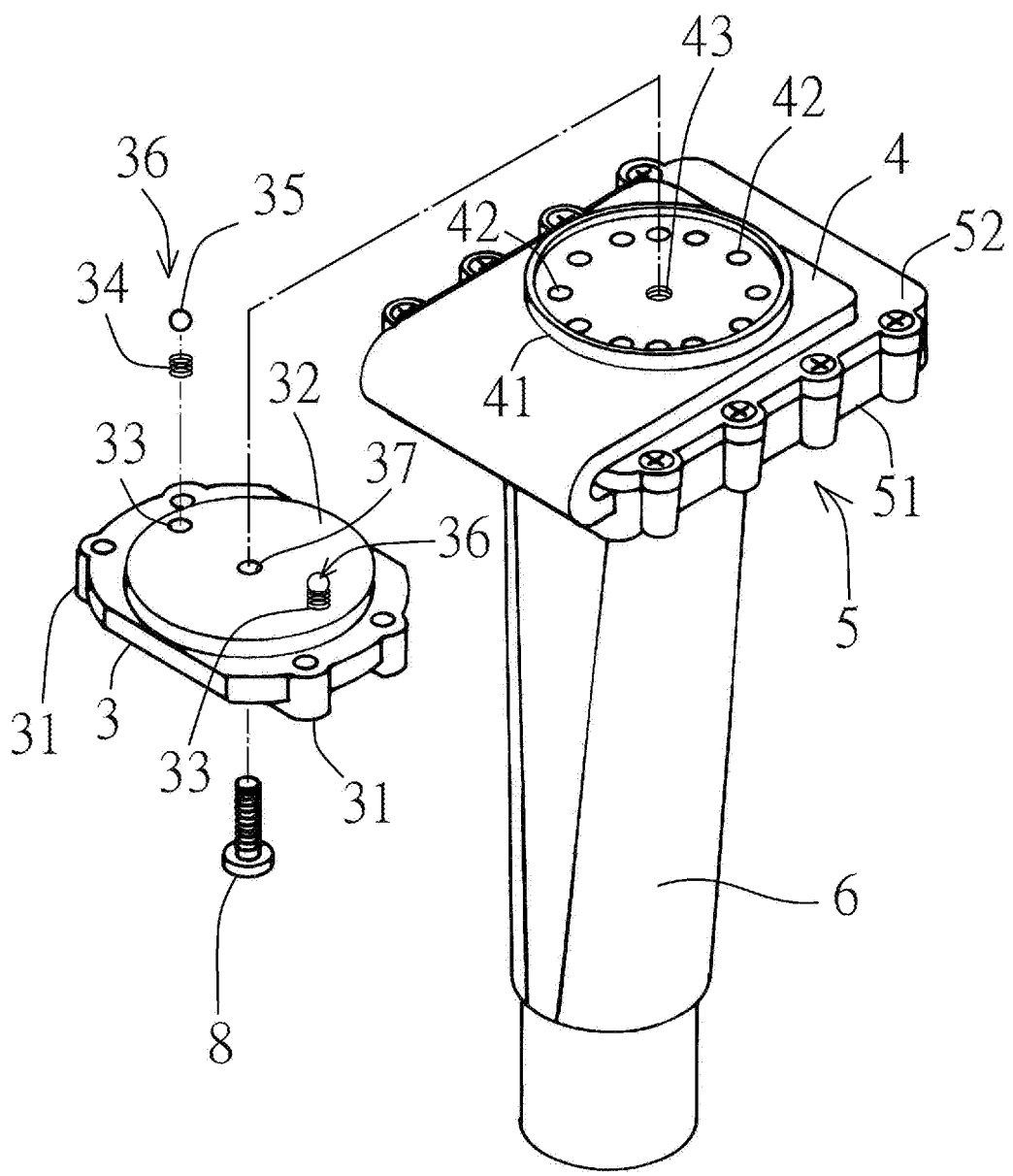
FIG. 3 is a perspective view showing the exploded components of a rotatable fixer of the rotation adjuster of the armrest according to the preferred embodiment of the present invention.

A rotation adjuster of an armrest according to a preferred embodiment of the present invention comprises: a supporting extension 1, a holding tray 2 connected on a bottom of the supporting extension 1, a rotatable fixer 3 connected on a bottom of the holding tray 2, and a U-shaped plate 4 having a circular groove 41 which is rotatably connected with the rotatable fixer 3 (as shown in FIGS. 1, 2 and 2-1), a slidable seat 5 engaged with an end of the U-shaped plate 4, a support post 6 connected with a bottom of the slidable seat 5, and two slidable engagement structures 7 respectively defined between the holding tray 2 and the rotatable fixer 3 and between the U-shaped plate 4 and the slidable seat 5, wherein the rotatable fixer 3 includes multiple pushing elements 36 fixed thereon, and multiple arcuate notches 42 surround around an inner rim of the circular groove 41 (as shown in FIG. 3).

The holding tray 2 includes a body 21 locked on the supporting extension 1 (the bottom of the supporting extension 1 is depressed and corresponds to a shape of the body 21 so that the supporting extension 1 accommodates and is locked with the holding tray 2), and the holding tray 2 includes multiple spaced recesses 22 defined in the body 21.

The rotatable fixer 3 includes multiple columns 31 extending from a top thereof and locked with the multiple spaced recesses 22 respectively so as to limit a moving distance of the supporting extension 1, a circular protrusion 32 extending from a bottom of the rotatable fixer 3 and corresponding to the circular groove 41, multiple receiving orifices 33 configured to accommodate multiple springs 34, multiple balls 35 and the multiple pushing elements 36 respectively, and a connection orifice 37 defined on a center of the rotatable fixer 3.

Figure 4:
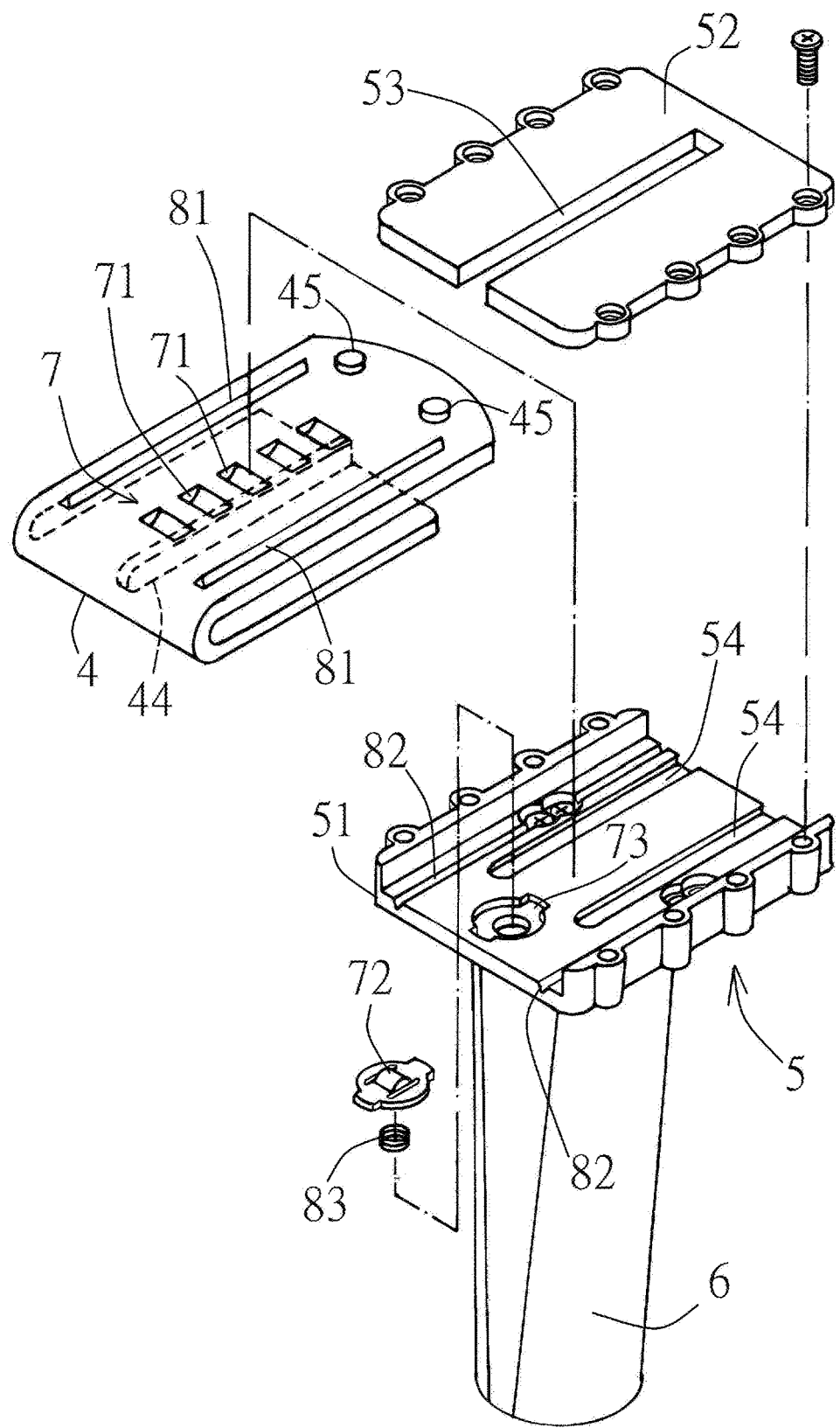
FIG. 4 is a perspective view showing the exploded components of a slidable seat of the rotation adjuster of the armrest according to the preferred embodiment of the present invention.

The U-shaped plate 4 includes the circular groove 41, a first rib 44 extending from a center of an inner surface of the U-shaped plate 4 (as illustrated in FIG. 4), the multiple arcuate notches 42 surrounding around the inner rim of the circular groove 41, a threaded orifice 43 defined on a center of the circular groove 41, and two locking pegs 45 extending from a distal end of an outer surface of the U-shaped plate 4.

The slidable seat 5 includes a U-shaped frame 51 and a covering sheet 52 corresponding to a shape of the U-shaped frame 51, a first slot 53 defined on the covering sheet 52 and accommodating the first rib 44, two second slots 54 defined on the U-shaped frame 51 accommodating the two locking pegs 45 so as to limit the moving distance, wherein two openings of the two second slots 54 are opposite to an opening of the first slot 53, and a surface of the U-shaped plate 4 having the two locking pegs 45 limits a movement distance of connection.

Each of the two slidable engagement structures 7 includes multiple arcuate notches 71 formed on a first contact face of each slidable engagement structure 7, and each slidable engagement structure 7 includes a flexible projection 72 received in a trench 73 so as to flexibly engage with the multiple arcuate notches 71.

In assembly, a screw 8 is inserted through the connection orifice 37 of the rotatable fixer 3 to screw with the threaded orifice 43 of the U-shaped plate 4 so that the circular protrusion 32 is rotatably connected with the circular groove 41, and the multiple pushing elements 36 abut against the multiple arcuate notches 42 respectively, thus rotating and moving the supporting extension 1 relative to the support post 6 forward, backward, leftward, and rightward.

Figure 5:
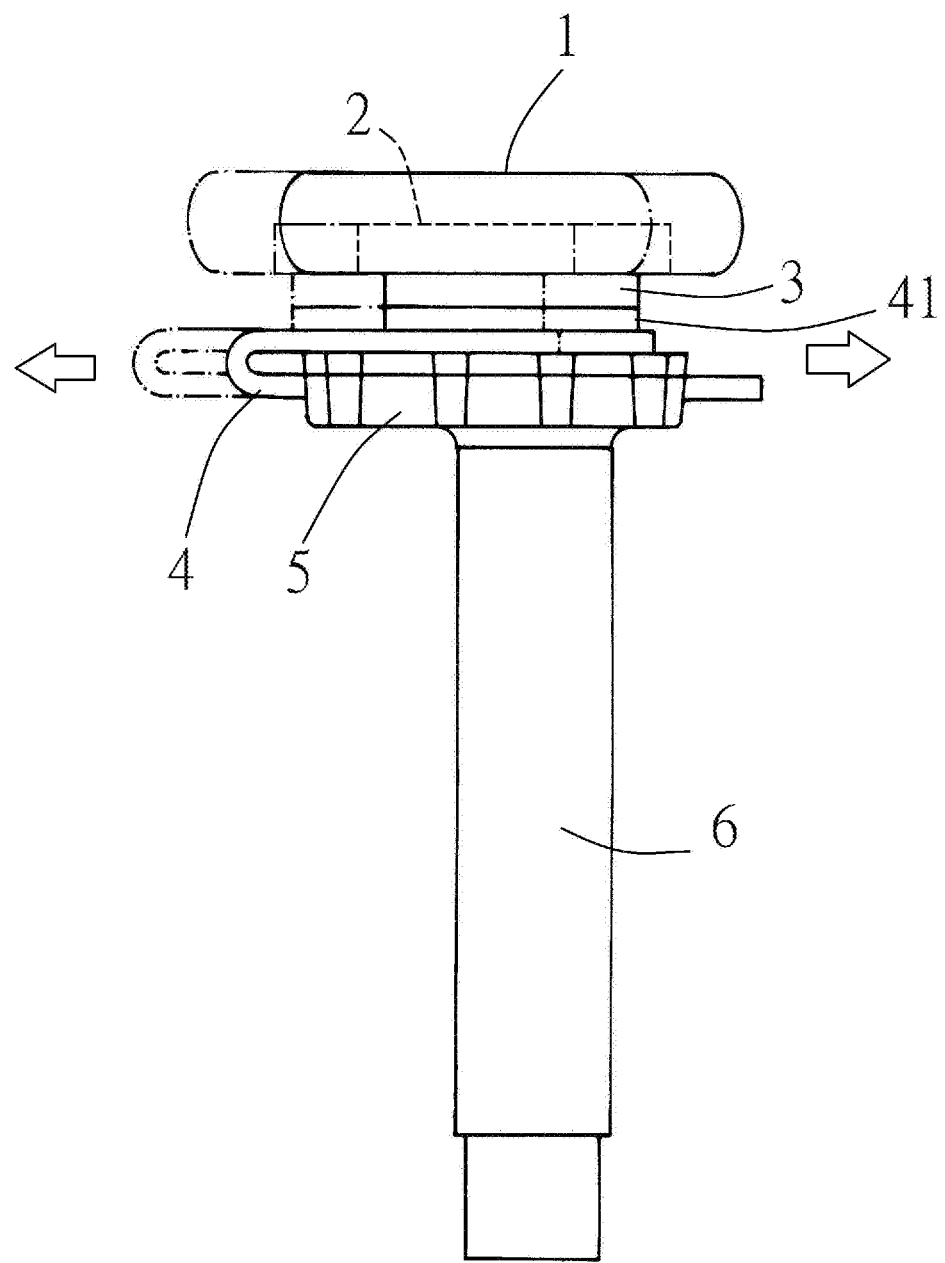
FIG. 5 is a side plan view showing the operation of the rotation adjuster of the armrest according to the preferred embodiment of the present invention.
Figure 6:
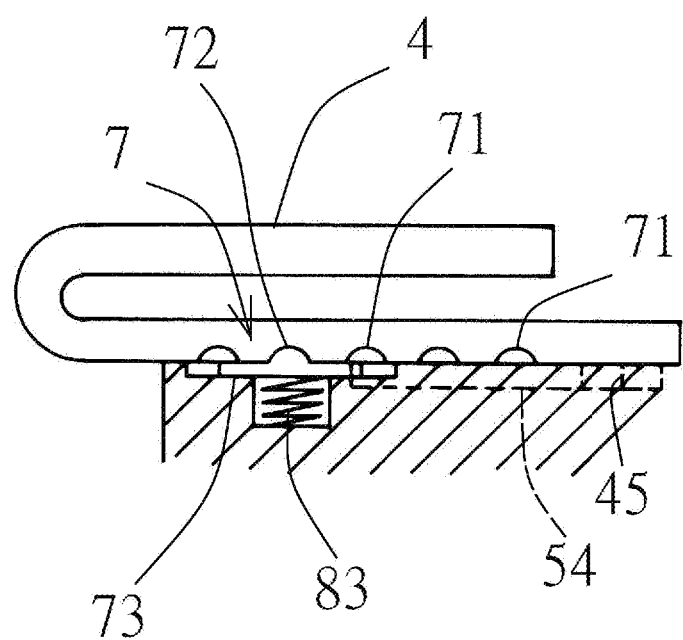
FIG. 6 is a side plan view showing the assembly of a slidable engagement structure defined between a U-shaped plate and the slidable seat of the rotation adjuster of the armrest according to the preferred embodiment of the present invention.

In operation, multiple spaced recesses 22 of the holding tray 2 are slid relative to the multiple columns 31 of the rotatable fixer 3 respectively so as to adjustably move the supporting extension 1 forward and backward (in this embodiment, some of multiple spaced recesses 22 are aligned in a row, and the other spaced recesses 22 are aligned in the other row, wherein the multiple spaced recesses 22 in each row are combined to form a sole recess having a longer length), and the two slidable engagement structures 7 fix the holding tray 2 and the rotatable fixer 3 (the flexible projection 72 engages with any one of the multiple arcuate notches 71, when a sliding force is more than an engaging force, the flexible projection 72 flexibly deforms downward so that one of the multiple arcuate notches 71 passes through the flexible projection 72). Since the rotatable fixer 3 is rotated 360 degrees relative to the circular groove 41, and the multiple balls 35 of the pushing elements 36 are pushed by the multiple springs 34 individually to engage with any one arcuate notch 42 (The pushing elements 36 is configured in a plurality of numbers) when a rotating force is more than the engaging force of the multiple springs 34, the multiple arcuate notches 42 slide through the multiple balls 35) so that the supporting extension 1 is adjustably rotated relative to the support post 6. Thereafter, the end of the U-shaped plate 4 is engaged with the slidable seat 5, and one of the two slidable engagement structures 7 is defined between the U-shaped plate 4 and the slidable seat 5 (as shown in FIGS. 5 and 6) so as to slide the supporting extension 1 relative to the support post 6 leftward and rightward, thus rotating and moving the supporting extension 1 relative to the support post 6 forward, backward, leftward, and rightward. Thereby, after fixing the rotation adjuster on two sides of a chair seat, the supporting extension is adjustable based on using requirements so as to support a user's two arms and to obtain using ergonomics. Preferably, the supporting extension 1 is lifted and descended as a conventional support post 6. Since it is a well-known art to lift and descent the supporting extension 1, further remarks are omitted.

Furthermore, the first contact face of each slidable engagement structure 7 has multiple second ribs 81, and the second contact face of each slidable engagement structure 7 has multiple rails 82 corresponding to the multiple second ribs 81 individually so as to slide the first and second contact faces of each slidable engagement structure 7 smoothly. The trench 73 receives a resilient element 83 for contacting with the flexible projection 72 so as to provide an engagement of the multiple arcuate notches 71.

While various embodiments in accordance with the present invention have been shown and described, it is clear to those skilled in the art that further embodiments may be made without departing from the scope of the present invention.

What is claimed is:

1. A rotation adjuster of an armrest comprising: a supporting extension, a holding tray connected on a bottom of the supporting extension, a rotatable fixer connected on a bottom of the holding tray, and a U-shaped plate having a circular groove which is rotatably connected with the rotatable fixer, a slidable seat engaged with an end of the U-shaped plate, a support post connected with a bottom of the slidable seat, and two slidable engagement structures respectively defined between the holding tray and the rotatable fixer and between the U-shaped plate and the slidable seat, wherein the rotatable fixer includes multiple pushing elements fixed thereon, and multiple arcuate notches surround around an inner rim of the circular groove; wherein the holding tray includes a body and multiple spaced recesses; wherein the rotatable fixer includes multiple columns, a circular protrusion, multiple receiving orifices configured to accommodate multiple springs, multiple balls and the multiple pushing elements respectively, and a connection orifice; wherein the U-shaped plate includes the circular groove, a first rib, a threaded orifice, and two locking pegs; wherein the slidable seat includes a U-shaped frame and a covering sheet corresponding to a shape of the U-shaped frame, a first slot defined on the covering sheet and accommodating the first rib, two second slots defined on the U-shaped frame accommodating the two locking pegs so as to limit the moving distance, wherein two openings of the two second slots are opposite to an opening of the first slot; wherein each of the two slidable engagement structures includes multiple arcuate notches formed on a first contact face of each slidable engagement structure, and each slidable engagement structure includes a flexible projection received in a trench so as to flexibly engage with the multiple arcuate notches; wherein a screw is inserted through the connection orifice of the rotatable fixer to screw with the threaded orifice of the U-shaped plate so that the circular protrusion is rotatably connected with the circular groove, and the multiple pushing elements abut against the multiple arcuate notches respectively, thus rotating and moving the supporting extension relative to the support post forward, backward, leftward, and rightward.

2. The rotation adjuster as claimed in claim 1, wherein the first contact face of each slidable engagement structure has multiple second ribs, and the second contact face of each slidable engagement structure has multiple rails corresponding to the multiple second ribs individually.

3. The rotation adjuster as claimed in claim 1, wherein the flexible projection receives a resilient element for contacting with the trench.

4. The rotation adjuster as claimed in claim 2, wherein the flexible projection receives a resilient element for contacting with the trench.

\* \* \* \* \*